(No Model.)
J. M. STUART.
Traction Wheel.
No. 236,646. Patented Jan. 11, 1881.
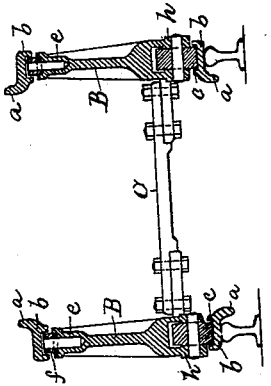
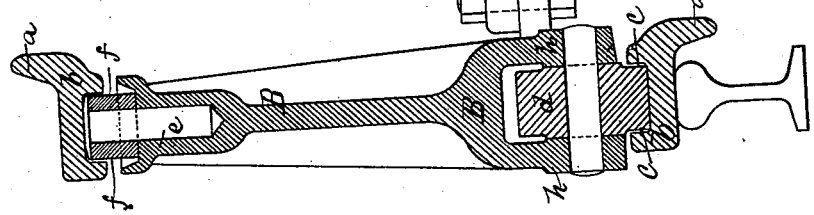
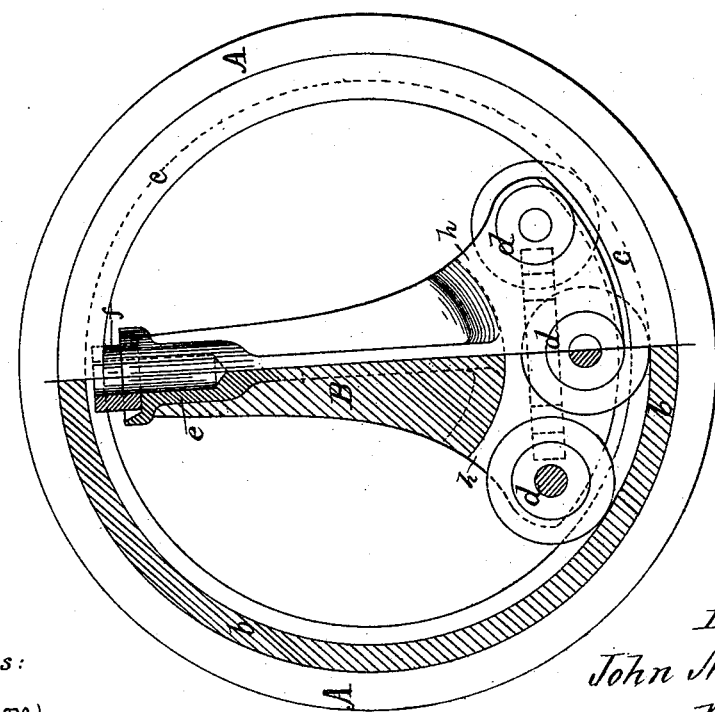
Witnesses:
W. B. Masson.
N. C. Chaffee
Inventor:
John M. Stuart,
pr. Norman W. Stearns,
Attorney.

UNITED STATES PATENT OFFICE.

JOHN M. STUART, OF NEW YORK, N. Y.

TRACTION-WHEEL.

SPECIFICATION forming part of Letters Patent No. 236,646, dated January 11, 1881.

Application filed November 18, 1880. (No model.)

*To all whom it may concern:*

Be it known that I, JOHN M. STUART, of New York city, in the county and State of New York, have invented certain Improvements in Traction-Wheels for Locomotive-Engines, Carriages, &c., of which the following is a full, clear, and exact description, reference being had to the accompanying drawings, making part of this specification, in which—

Figure 1 represents a side elevation of the driving-wheel of a locomotive-engine with my improvements applied thereto, some of the parts being shown in section. Fig. 2 is a vertical section through the center of the same. Fig. 3 is an end elevation of a pair of wheels connected.

My present invention relates to certain improvements in that class of driving-wheels for locomotives, traction-engines, railroad-cars, or wagons in which the body of the vehicle to which they are attached is designed to rest near the track or roadway, the axles being located near the lower point of the periphery of the driving or track wheel, and the entire weight of the engine or carriage, with the load thereon, resting on the inside of the tire of said wheel, contiguous to the track or ground; and my said invention consists in the peculiar construction of such wheels and of certain auxiliary wheels and mechanism connected therewith, as will hereinafter be fully described and claimed, whereby the driving or track wheels are maintained in a true vertical position without lateral strain, and thus effectively operated with a minimum expenditure of power.

To enable others skilled in the art to understand and use my invention, I will proceed to describe the manner in which I have carried it out.

In the said drawings, A represents an open track-wheel provided with a flange, *a*, and rim or tire *b*, within the inner side of which is formed a continuous or annular groove, *c*, which serves as a guideway or path for the burden or supporting wheels *d d d*, the journals of which revolve in suitable bearings in the lower portion of an upright standard, B. Within the upper part of this standard B is fitted the short vertical arbor *e* of a small horizontal wheel or friction-roller, *f*, which rotates freely in the annular groove *c* of the rim, and thus tends to diminish frictional or lateral strain at the upper part of the wheel A, and maintains it at all times in a true vertical position, the roller *f* fitting loosely on its arbor *e*, and the latter being tightly secured within the standard B. The bottom of each standard terminates in bifurcations *h h*, for the reception of the burden-wheels *d d d*, which are fitted tightly to their journals, the latter turning freely in their bearings in said bifurcations. A pair of standards, B, are connected near their lower ends by an axle, C, bolted thereto and extending transversely between them, the truck or body of the engine or carriage (not shown) being intended to be supported by said axle. Suitable oil cups or receptacles are provided at necessary points, by which the parts are lubricated.

From the foregoing description and accompanying drawings the operation and advantages of my invention will be readily appreciated.

When applied to the driving-wheels of a locomotive-engine the connecting-rod may be attached, by means of a crank, to the center one of the small or burden wheels *d*, which, through its frictional bearing in the groove *c* of the driving-wheel A, revolves the latter, being assisted by the two remaining burden-wheels *d d*, the three wheels *d d d*, in conjunction with the frictional roller *f*, also serving as guides to insure the driving-wheel A being constantly kept in a vertical plane of revolution, thereby obviating undue strain of the parts.

The operation is substantially the same in other wheels to which my invention may be adapted.

By applying power in the manner above described to ordinary street-cars and omnibuses, the body of the vehicle may rest close to the ground, thus permitting passengers to enter from the street-level without the use of steps.

It is believed that by the application of my improvements to a street-car one horse will be enabled to draw it with less effort than is now exerted by two in drawing a car of the present construction.

I do not limit myself to the use of three burden-wheels, *d*, as their number may be varied to conform to the size of the track-wheel without departing from the spirit of my invention.

I claim—

The standard B, having one or more wheels, d, pivoted within its lower bifurcated end, and with a roller, f, at its upper end, in combination with the inclosing driving or track wheel A, having an annular groove, c, within the inner side of its rim for the reception of wheels d and roller f, as and for the purose set forth.

Witness my hand this 11th day of October, 1880.

JOHN M. STUART.

In presence of—
   CHAS. EDGAR MILLS,
   E. J. BUNKER.